(12) United States Patent
Bhattacharyya et al.

(10) Patent No.: US 10,015,146 B2
(45) Date of Patent: Jul. 3, 2018

(54) COMPUTER IMPLEMENTED SYSTEM AND METHOD FOR SECURE SESSION ESTABLISHMENT AND ENCRYPTED EXCHANGE OF DATA

(71) Applicant: Tata Consultancy Services Ltd., Mumbai, Maharashtra (IN)

(72) Inventors: Abhijan Bhattacharyya, Kolkata (IN); Tulika Bose, Kolkata (IN); Soma Bandyopadhyay, Kolkata (IN); Arjit Ukil, Kolkata (IN); Arpan Pal, Kolkata (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 322 days.

(21) Appl. No.: 14/918,007

(22) Filed: Oct. 20, 2015

(65) Prior Publication Data
US 2016/0112381 A1    Apr. 21, 2016

(30) Foreign Application Priority Data
Oct. 20, 2014    (IN) .......................... 3349/MUM/2014

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0869* (2013.01); *H04L 63/061* (2013.01);
(Continued)

(58) Field of Classification Search
None
See application file for complete search history.

(56) References Cited

U.S. PATENT DOCUMENTS

| 8,281,134 B2 | 10/2012 | Bajic |
| 2008/0065884 A1 | 3/2008 | Emeott |

(Continued)

FOREIGN PATENT DOCUMENTS

| EP | 1858224 | 11/2007 |
| WO | 2014107222 | 7/2014 |

OTHER PUBLICATIONS

Hummen, et al., "Towards Viable Certificate-based Authentication for the Internet of Things", HotWiSec'13, Apr. 19, 2013, Budapest, Hungary.
(Continued)

*Primary Examiner* — Michael R Vaughan
(74) *Attorney, Agent, or Firm* — Blueshift IP, LLC; Robert Plotkin

(57) ABSTRACT

A system(s) and method(s) for secure session establishment and secure encrypted exchange of data is disclosed. The system satisfies authentication requirement of general networking/communication systems. It provides an easy integration with systems already using schemes like DTLS-PSK. The system follows a cross layer approach in which session establishment is performed in a lightweight higher layer like the application layer. The system then passes resultant parameters of such session establishment including the session keys to a lower layer. The lower layer like the transport layer is then used by the system to perform channel encryption to allow exchange of encrypted data based on a cross layer approach, over a secure session. As the exchange of data becomes the responsibility of the lower layer like the transport layer, the data is protected from replay attacks since the transport layer record encryption mechanism provides that kind of protection.

13 Claims, 7 Drawing Sheets

(51) Int. Cl.
*H04W 12/02* (2009.01)
*H04W 4/70* (2018.01)
*H04W 4/00* (2018.01)

(52) U.S. Cl.
CPC ......... *H04W 12/02* (2013.01); *H04L 63/0435* (2013.01); *H04L 63/0869* (2013.01); *H04L 63/166* (2013.01); *H04L 2209/24* (2013.01); *H04W 4/005* (2013.01); *H04W 4/70* (2018.02)

(56) References Cited

U.S. PATENT DOCUMENTS

| | | |
|---|---|---|
| 2010/0031042 A1 | 2/2010 | Di Crescenzo |
| 2013/0170645 A1* | 7/2013 | Chang ................ H04L 63/0435 380/278 |
| 2014/0101447 A1* | 4/2014 | Lekies ................ H04L 9/0841 713/169 |
| 2014/0143855 A1 | 5/2014 | Keoh |
| 2015/0222517 A1* | 8/2015 | McLaughlin ......... H04L 67/303 713/156 |

OTHER PUBLICATIONS

Kothmayr, et al., "DTLS based Security and Two-Way Authentication for the Internet of Things", Ad Hoc Networks, vol. 11, Issue 8, Nov. 2013, pp. 2710-2723.

* cited by examiner

COMPUTER IMPLEMENTED SYSTEM AND METHOD FOR SECURE SESSION ESTABLISHMENT AND ENCRYPTED EXCHANGE OF DATA

TECHNICAL FIELD

The present disclosure relates to secure authentication and encrypted exchange of data between a server and a client.

DEFINITIONS OF TERMS USED IN THE SPECIFICATION

The expression 'IoT' used hereinafter in this specification refers to Internet of Things wherein uniquely identifiable objects are virtually represented in the Internet structure.

The expression 'M2M' used hereinafter in this specification refers to Machine to Machine technologies that allow both wireless and wired systems to communicate with heterogeneous devices.

The expression 'nonce' used hereinafter in this specification refers to a random number that is used only once.

The expression 'datagram transport' used hereinafter in this specification refers to a connectionless transport protocol, an exemplary and popular implementation of which is User Datagram Protocol (UDP).

The expression 'provisioning phase' used hereinafter in this specification refers to the process of preparing and equipping the client side and server side before communication. It includes steps like embedding a pre-shared-secret key.

The expression 'session initiator' used hereinafter in this specification refers to a device/client that initiates a session by sending an initial 'HELLO' message (session initiation request) to the server.

The expression 'session key tuple' used hereinafter in this specification refers to an ordered list of elements that is needed by both a client device and a server for encrypted exchange of data during a session.

The expression 'constrained devices' used hereinafter in this specification refers to devices that have constrained processing resources including time and power.

The expression 'transport layer security scheme' used hereinafter in this specification refers to a protocol that ensures privacy between the devices communicating on the Internet.

The expression 'DTLS scheme' used hereinafter in this specification refers to a Datagram Transport Layer Security protocol that provides communications security for datagram oriented transport protocols. It allows secure communication between datagram-based applications by preventing network attacks like eavesdropping, tampering and message forgery.

The expression 'DTLS-PSK' used hereinafter in this specification refers to a variation of DTLS protocol that provides secure communication based on pre-shared keys (PSKs). These pre-shared keys are shared in advance among the communicating devices and are symmetric in nature.

The expression 'application layer' used hereinafter in this specification refers to an abstraction layer that specifies shared protocols and interface methods used by servers in a communications network. It provides services to ensure effective communication between different applications in a network.

The expression 'transport layer' used hereinafter in this specification refers to an end-to-end communication service for applications within a layered architecture of network components and protocols. It ensures the reliable arrival of messages and provides error checking mechanisms and data flow controls.

The expression 'cross layer approach' used hereinafter in this specification refers to a technique of removing boundaries enforced by a networking model between the layers in order to allow communication between the layers by permitting one layer to access the data of another layer thus enabling interaction and exchange of information between the layers.

These definitions are in addition to those expressed in the art.

BACKGROUND

In the networking communication world, IoT/M2M communication terminals have become an important form of networking applications. The Internet of Things (IoT) is a scenario in which objects, animals or people have the ability to transfer data over a network without requiring human-to-human or human-to-computer interaction or M2M communication. A thing, in the Internet of Things, can be a person with a heart monitor implant, a wireless security camera installed on the corner of the street, an automobile that has built-in sensors to alert the driver when tire pressure is low or any other natural or man-made object that can be assigned an IP address and provided with the ability to transfer data over a network.

The challenge faced with respect to IoT/M2M communication is robust and secure transmission of data because leaking of such data can profoundly impact our security, health, environment and finances.

The conventional security solutions for communication, like public key cryptosystem, Transport layer security scheme and IP layer security, are costly in terms of the processing power, energy and bandwidth requirement where the 'things' in IoT are small devices with limited processing power and battery storage.

Although there are lightweight application-layer protocols like CoAP which is used in resource-constrained devices for transferring data over the Web, it does not have any inherent security capability. Therefore, to achieve a secure communication, CoAP mandates the use of DTLS. DTLS has several configurations where the maximum resource consuming variation uses certificate based authentication using public key infrastructure, whereas the minimum resource consuming variant of DTLS is a Pre-shared-key (PSK) mode. These variations/configurations provide end-point authentication. But, the exchanges required for such authentication establishment are not very lightweight.

Thus, there exists a need for a system that securely transmits data for constrained devices and utilizes less processing resources, bandwidth, and power, and increases throughput.

OBJECTS

Some of the objects of the present disclosure aimed to ameliorate one or more problems of the prior art or to at least provide a useful alternative are described herein below:

An object of the present disclosure is to provide a system for lightweight secure session establishment between constrained devices which utilizes less processing resources, bandwidth, time and power.

Another object of the system of the present disclosure is to provide a system that can be integrated with the conventional transport layer encryption mechanism as used in DTLS to perform the exchange of encrypted data over the secure session and thus ensuring channel security.

Still another object of the present disclosure is to provide a lightweight system for secure session establishment between constrained devices which provides secure session establishment comprising mutual authentication and key negotiation for encrypted exchange of data between the end points.

Further object of the present disclosure is to provide a lightweight system for secure session establishment and to communicate over a secure transport channel which protect from 'replay attack' and 'meet in the middle attack'.

Other objects and advantages of the present disclosure will be more apparent from the following description when read in conjunction with the accompanying figures, which are not intended to limit the scope of the present disclosure.

SUMMARY

The present disclosure relates to a computer implemented system and method for lightweight secure session establishment and secure encrypted data exchange between endpoints. In an embodiment the system may be operated within a network. The end-points may be a plurality of client devices and a plurality of servers. The system may group components for secure session establishment in an application layer associated with the network and components for secure encrypted data exchange in the transport layer associated with the network of the system protocol in order to implement the system with a cross layer approach. The components present in the system for secure session establishment between a plurality of client devices and a plurality of servers may comprise a first key generator, a first random number generator and a second random number generator configured in each of the client devices, and a third random number generator and a second key generator configured in each of the plurality of servers to facilitate secure session establishment by mutual authentication. The components present in the system for secure encrypted data exchange between the plurality of client devices and the plurality of servers may comprise a session key tuple creator having a session initialization vector creator, where the session key tuple creator maybe configured to create and transmit a session key tuple, to mutually authenticated client devices and servers thereby enabling secure encrypted data exchange between the client devices and the servers.

This summary is provided to introduce concepts related to providing global context based instrumentation to assert the software quality, which is further described below in the detailed description. This summary is neither intended to identify essential features of the claimed subject matter nor is it intended for use in determining or limiting the scope of the claimed subject matter.

BRIEF DESCRIPTION OF ACCOMPANYING DRAWINGS

The system of the present disclosure will now be described with the help of the accompanying drawings, in which.

DETAILED DESCRIPTION

The system of the present disclosure will now be described with reference to the embodiment shown in the accompanying drawing. The embodiment does not limit the scope and ambit of the disclosure. The description relates purely to the examples and preferred embodiments of the disclosed system and its suggested applications.

The system herein and the various features and advantageous details thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein. Accordingly, the examples should not be construed as limiting the scope of the embodiment herein.

In accordance with the present disclosure, the system provides a lightweight and robust challenge-response based scheme to establish a secure session with mutual authentication of the endpoints integrated with a key-sharing mechanism for a typical constrained IoT/M2M environment. The system satisfies authentication requirement of general networking/communication systems. It also provides an easy integration with systems already using schemes like DTLS-PSK. In this system the session establishment responsibility is taken up by a lightweight application layer like CoAP using the proposed generic scheme. The resultant parameters of such session establishment process including the session keys are passed on to a transport layer record encryption mechanism as used in schemes like DTLS to perform the exchange of encrypted data over the secure session. Thus the exchange of data becomes the responsibility of the transport layer. This way the data is protected from replay attacks as the transport layer record encryption mechanism provides that kind of protection.

Figure 1:
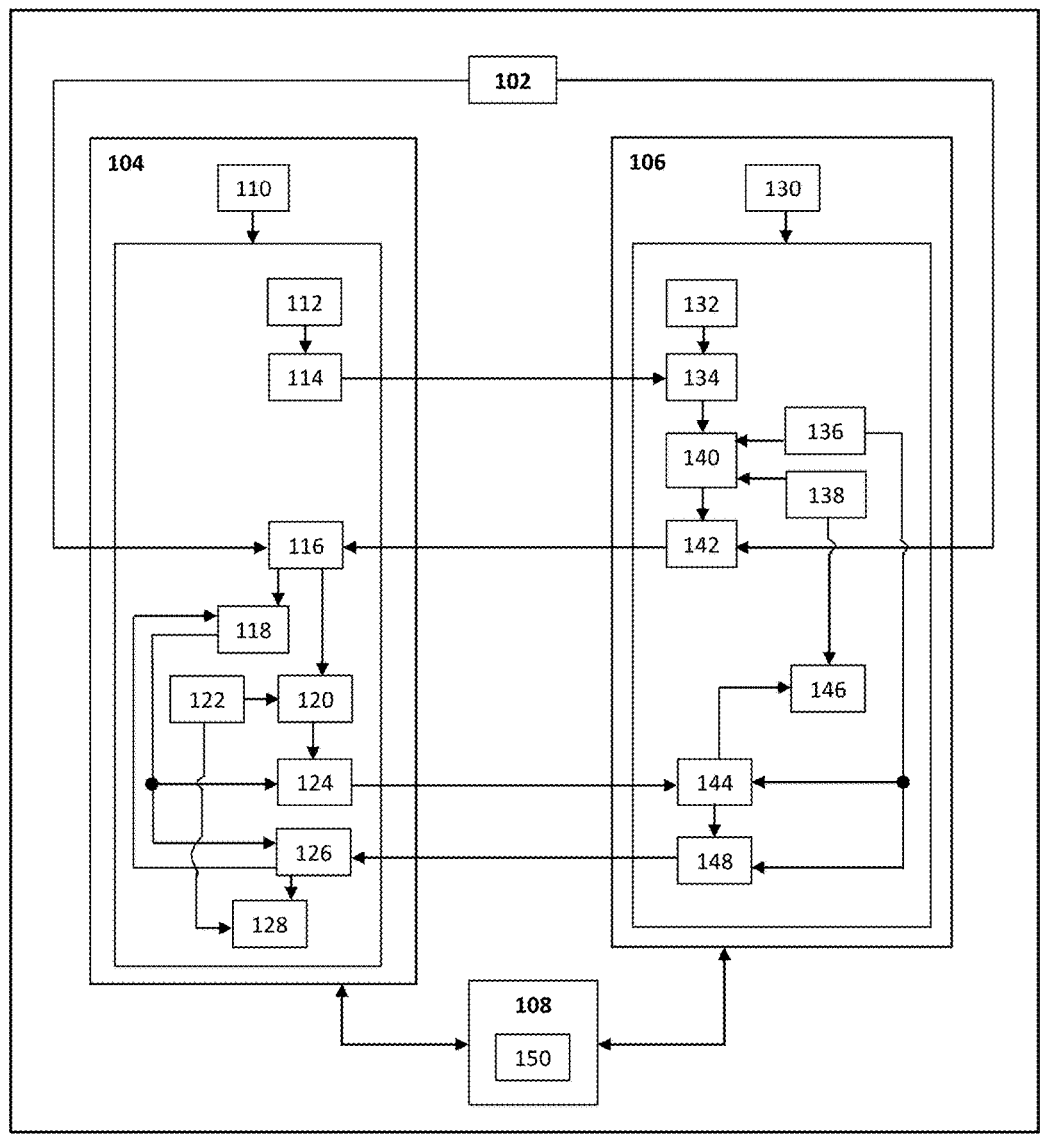
FIG. 1 illustrates a schematic diagram of one embodiment of the system that provides lightweight secure session establishment and encrypted exchange of data between end-points.

Referring to the accompanying drawings, FIG. 1 illustrates one embodiment of the system 100 that provides lightweight secure session establishment and encrypted exchange of data between end-points. In this embodiment a client device and a server are the end-points between whom a secure session is established and encrypted data is exchanged. In an embodiment, the system 100 operating within a network comprises session establishment components grouped in the application layer and components for secure encrypted data exchange grouped in the transport layer. This allows partitioning of responsibilities of the session establishment and the encrypted exchange between the application layer and the transport layer. The system 100 comprises a first key generator 102, a plurality of client devices 104, a plurality of servers 106 and a session key tuple creator 108. The first key generator 102 generates and transmits secret keys to the servers 106 and the client devices 104 prior to secure session establishment during the provisioning phase. Each of the client devices 104 have a unique identifier and comprise a first processor 110 that provides a first set of processing commands to components present in the client device 104 based on a pre-determined first set of rules. Each of the servers 106 comprise a second processor 130 that provides a second set of processing commands to components present in the servers 106 based on a pre-determined second set of rules. The client device 104 in order to initiate a session with the server 106 sends a session initiation request to the server 106. The session initiation request is generated by a session initiator 114 by cooperating with a first random number generator 112. The first random number generator 112 generates a first random number and transmits it to the session initiator 114. The session initiator 114 then generates the session initiation request which includes the first random number and respective unique identifier of the client device 104. This session initiation request is received by an identifier 134 present in the server 106. The server 106 includes a first repository 132 that stores a plurality of unique identifiers corresponding to the client devices 104. On reception of the session initiation request, the identifier 134 matches the unique identifier received in the session initiation request with the unique identifiers stored in the first repository 132 to identify the client device 104. Once the client device 104 is identified a challenge code generator 140 generates a challenge code comprising the first random number received in the session initiation request, a client key generated by a second key generator 136 and a third random number generated by a third random number generator 138. This generated challenge code is then encrypted by a first encrypter 142 with the secret key pre-shared by the first key generator 102. The encrypted challenge code is then transmitted by the first encrypter 142 present in the server 106 to the client device 104. A first decrypter 116 present in the client device 104 receives the encrypted challenge code and decrypts the challenge code with the secret key pre-shared by the first key generator 102 to obtain the client key and the third random number present in the challenge code. The obtained client key is stored in a second repository 118. The client device 104 includes a second random number generator 122 that generates a second random number. A response generator 120 present in the client device 104 then generates a response code comprising the generated second random number and the third random number received after decryption. This response code is encrypted by a second encrypter 124 with the client key stored in the second repository 118. The second encrypter 124 present in the client device 104 then transmits this encrypted response code to the server 106. A second decrypter 144 present in the server receives this response code encrypted with the client key and decrypts the encrypted response code with the client key that was generated by the second key generator 136. On successful decryption, the second decrypter 144 obtains the third random number and the second random number present in the response code. A first comparator 146 present in the server 106 compares this obtained third random number with the third random number generated by the third random number generator 138. If the compared third random numbers match, the server 106 authenticates the client device 104.

After successful authentication, in order to achieve mutual authentication, a third encrypter 148 present in the server 106 generates and encrypts a final message. This final message comprises the second random number received in the response code, the third random number and a server key generated by the second key generator 136. This final message is encrypted by the third encrypter 148 with the secret key generated by the first key generator 102. The encrypted final message is then transmitted by the server 106 to the client device 104. A third decrypter 126 present in the client device 104 receives the encrypted final message and decrypts this final message with the secret key received earlier from the first key generator 102. On successful decryption, the third decrypter 126 obtains, from the final message, the third random number, the second random number and the server key. The server key is stored in the second repository 118 for further use. A second comparator 128 present in the client device 104 compares the second random number obtained after decryption with the second random number generated by the second random number generator 122. If both the compared second random numbers match, the client device 104 authenticates the server 106 thus, establishing a secure session for data exchange between the server 106 and the client device 104. Both, the client device 104 and the server 106 now have the client key and the server key.

Once the secure session is established, the session key tuple creator 108 receives the client key, the server key, the second random number and the third random number. The session key tuple creator 108 includes an initialization vector creator 150 that creates a server initialization vector and a client initialization vector based on the received second random number and the received third random number. Based on these initialization vectors and the client key and the server key, the session key tuple creator 108 creates a session key tuple containing the client key, the server key, the client initialization vector and the server initialization vector and transmits this session key tuple to the client device 104 and the server 106, thereby facilitating enabling secure encrypted data exchange between the client device 104 and the server 106. The client device 104 after receiving the session key tuple, encrypts data using the client key and the client initialization vector, and decrypts the data using the server key and the server initialization vector. Similarly, the server 106 after receiving the session key tuple encrypts data using the server key and the server initialization vector and decrypts data using the client key and the client initialization vector thus allowing secure encrypted data exchange.

Figure 2:
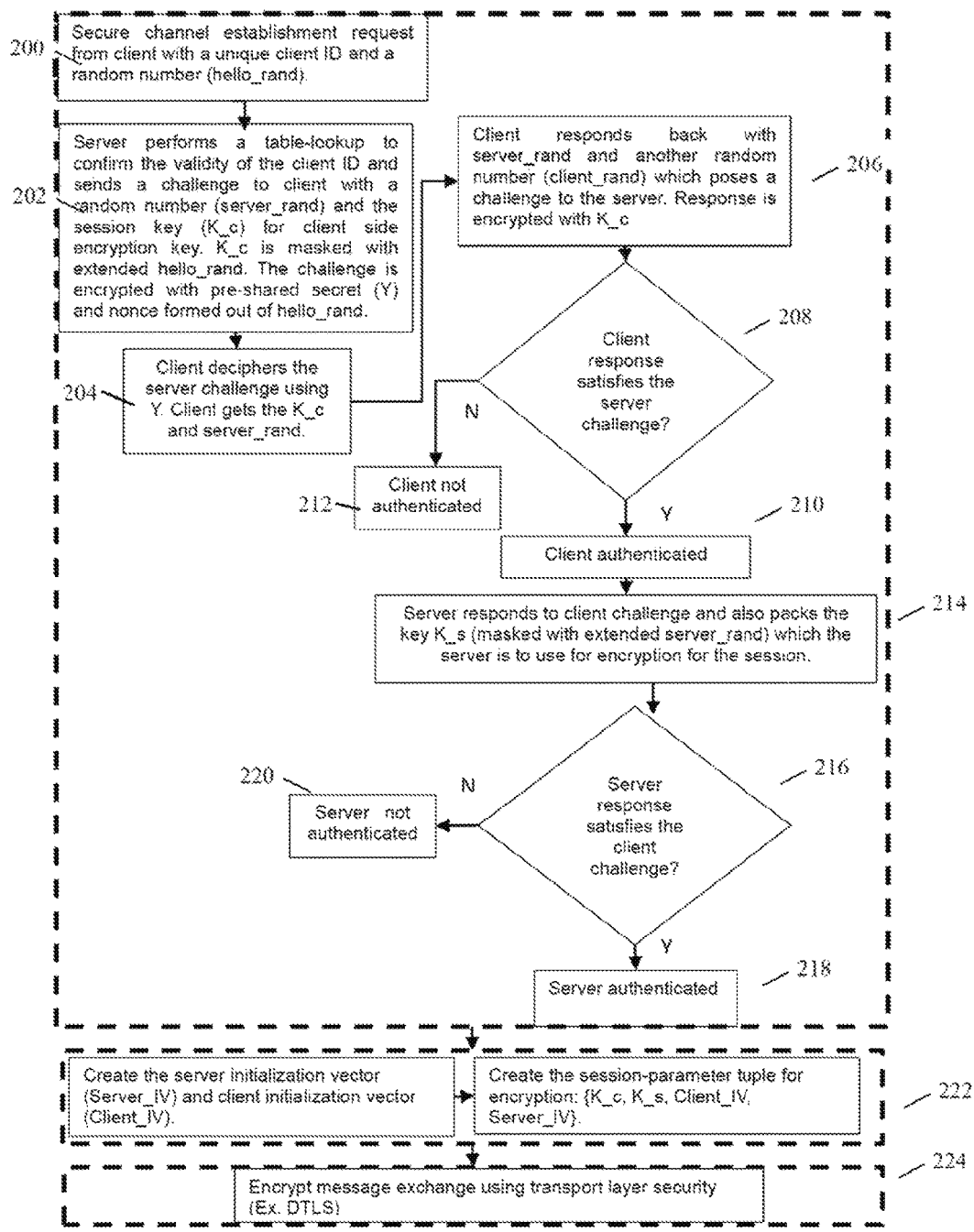
FIG. 2 illustrates the system flow for establishing secure session and encrypted message exchange.

Referring to the accompanying drawings, FIG. 2 illustrates the system flow for establishing secure session and encrypted message exchange over a secure channel. The system of the present disclosure provides a symmetric key based security mechanism where key management is integrated with authentication. It also maintains separate keys for the forward and reverse communication channel for a given end-point. A server and a client are two end-points that are configured with a pre-shared secret (Y) during a provisioning phase. A secure channel establishment request is initiated by the client by sending the server a HELLO message using an identifier (ID) unique to the client along with a random number called 'hello_rand' 200. The server, after receiving this message, first looks up the ID in a preconfigured database. But, in order to prevent spoofing by a malicious client the server also forms a challenge code by generating a challenge code comprising a unique key K_c (client-write-key) appended with a server random number 'server_rand'. The key K_c is a symmetric key for encryption and decryption for the channel from the client to the server and it is masked with the 'hello_rand' to protect the key against traffic analysis attack. The challenge code thus obtained is encrypted with the pre-shared secret (Y) and nonce formed out of 'hello_rand' 202. In one embodiment the challenge code is encrypted using AES_CCM_128 by using hello_rand as the nonce required for AES_CCM_128 encryption and sent to the client.

A legitimate client is able to decrypt/decipher the challenge code and get the server_rand and the key (K_c) supplied by the server 204. In response the client forms a response message which also contains a challenge for the server. The challenge for the server/response message includes a client created random number 'client_rand' appended to the server_rand. This response message is then encrypted with K_c 206. In one embodiment the encryption method used is AES_CCM_128 using server_rand to supply the required nonce for encryption.

The server decrypts the response from the client and matches the server_rand with its own copy to check if the client response satisfies the server challenge 208. If both of them match then the server authenticates the client 210 else the client is not authenticated 212. On authentication of client, the server responds to the client challenge with the final message. The final message includes a server generated key K_s (server-write-key) masked with the server_rand and appended to the client_rand. This final message is then encrypted with Y (pre-shared secret key) 214. In one embodiment AES_CCM_128 using client_rand is used to supply the required nonce for encryption. The key K_s is included in the final message by the server to let the client know that the server will be using that key for encrypting messages after successful authentication. On reception of this message, the client checks if the server response satisfiers the client challenge 216. If the client is able to decrypt and match client_rand with its own copy then client authenticates the server 218, else the server is not authenticated 220.

Figure 7:
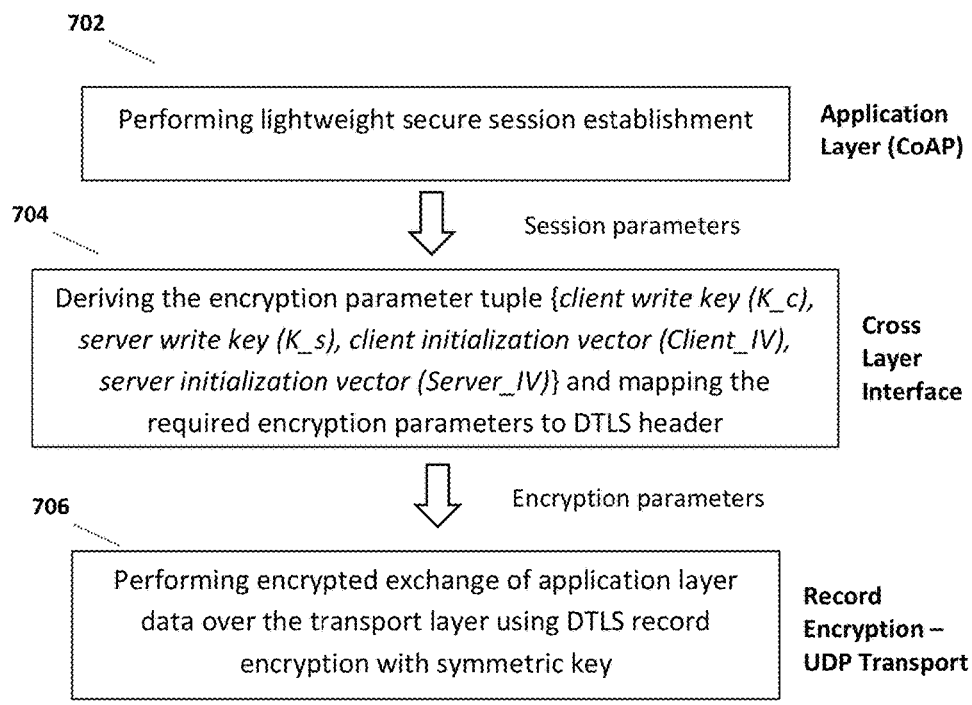
FIG. 7 illustrates a flow diagram of an embodiment of the system providing interface between session establishment process at the application layer and channel encryption process at the transport layer using exemplary protocols.

After this exchange, both the end-points (the client and the server) have received the key pairs (server-write-key, client-write-key) and a secure channel is established. Once the secure channel is established session parameters including the keys are supplied to the cross-layer interface (as illustrated in FIG. 7 of the accompanying drawings) and subsequently to the transport layer for secure exchange of information. Apart from the key-pair, the record encryption also requires server initialization vector (Server IV) and client initialization vector (Client IV). In an exemplary embodiment, these initialization vectors (IVs) are derived using server nonce and client nonce. This IV generation is denoted in step 222. Once the encryption parameters including the key-pairs and the IVs are obtained, encrypted message exchange takes place using the transport layer security 224.

Thus a secure session establishment and transaction is achieved by the system of the present disclosure which ensures protection against replay attack.

Figure 3:
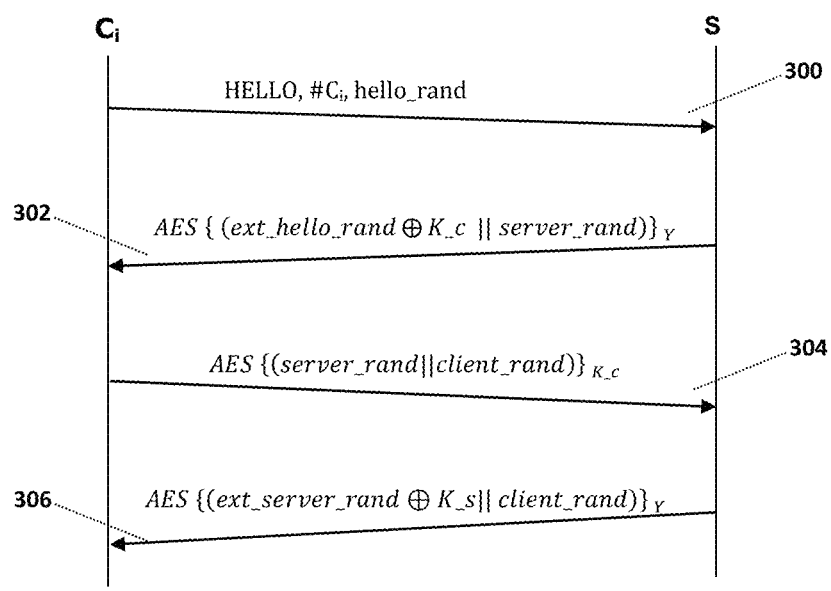
FIG. 3 illustrates the steps involved in session establishment during a handshake between a server and a client.

The notations used with reference to FIG. 3 and FIG. 5 of the accompanying drawings, are as follows:

Y: Shared secret between the client and the server.
AES{•}$_\kappa$: AES operation on plaintext using key κ
⊕: XOR
||: Concatenation Referring to the accompanying drawings, FIG. 3 illustrates the steps involved in session establishment during a handshake between a server and a client. It depicts a lightweight secure session establishment algorithm where $C_i$ represents client and S represents server. Before the secure session establishment process begins, a secret $Y=\{0,1\}^{128}$ is shared between $C_i$ and S offline at the provisioning phase. The secure session establishment process then starts with session initiation where the client $C_i$ sends 'HELLO, #$C_i$' and hello_rand to server S 300. Here, #$C_i$ is a unique client device ID and hello_rand=$\{0,1\}^{96}$. Once the session is initiated, the server S responds by sending a server challenge code 'AES {(ext_hello_rand ⊕K_c||server_rand)}$_Y$' to the client 302, where K_c=$\{0,1\}^{128}$, server_rand=$\{0,1\}^{96}$. ext_hello_rand=hello_rand||hello_rand[0:31]. The client $C_i$ decrypts the challenge code and responds to the server by sending another challenge code 'AES {(server_rand||client_rand)}$_{K\_c}$' 304 where client_rand=$\{0,1\}^{96}$ is the client response and challenge. At the server side, the server verifies server_rand and responds to the client by sending 'AES {(ext_server_rand ⊕ K_s||client_rand)}$_Y$' 306 where ext_server_rand=server_rand||server_rand[0:31]. K_s In one embodiment, the AES encryption is optionally implemented as AES_128_CCM_8. CCM mode needs 12 bit nonce for each encryption and an additional data. 'hello_rand', 'server_rand' and 'client_rand' serve as the required nonce values in steps 302, 304 and 306 respectively. The 'additional data' can be the header for each message of the application layer protocol (ex. CoAP).

Figure 4:
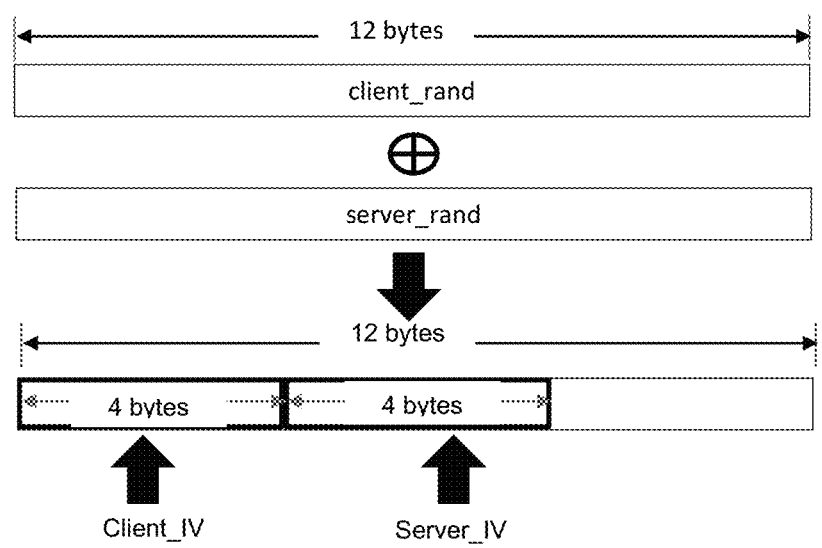
FIG. 4 illustrates an exemplary method to obtain the server and client initialization vectors required for AES encryption as used in conventional DTLS-record encryption mechanism.

Referring to the accompanying drawings, FIG. 4 illustrates an exemplary method to obtain the server and client initialization vectors required for AES encryption as used in conventional DTLS-record encryption mechanism. The system of the present disclosure enables interfacing with secured transport layer (DTLS). The interface essentially creates the necessary session parameters to be used by the underlying security layer for encrypted message exchange. The prime components of the session parameters are K_c and K_s. Other required parameters can be generated in different ways. Considering DTLS-record as an exemplary mechanism to transfer the messages securely the session key parameter tuple '{K_c, K_s, Client_IV, Server_IV}' is needed at both client and server ends. Here, 'IV' stands for an initialization vector. There are several alternatives for creating the IVs. The Client and server follow the same mechanism on same parameter values to ensure identical {Client_IV, Server_IV} pairs. For AES_128_CCM encrypted DTLS record IV is 4 bytes long. An exemplary mechanism with low-computation overhead is depicted in FIG. 4.

The secure session establishment disclosed in the present disclosure can be integrated as payload embedding with CoAP. A POST method with confirmable (CON) data transfer mode is applied to achieve secure session establishment between a client and a server. A new field 'AUTH' is introduced in the CoAP header to enable the secure (authentication) mode. This field uses an unused option indicating a critical option class. Another option named 'AUTH_MSG_TYPE' is also introduced along with 'AUTH' to indicate different messages for establishing an authentication session.

The option fields in a CoAP header carries optional request/response features in a CoAP message. The fields defined for the present disclosure are as follows:

AUTH: indicates enablement of authentication/disabling authentication mode. A True or False value can be set for this field.

AUTH_MSG_TYPE: this field can either be '0' or '1', where,
0=auth_init and 1='response_against_challenge'

The authentication session when enabled by setting 'AUTH=true' is maintained by using a constant 'Token' value in header for all associated messages exchanged during the authentication phase.

Figure 5:
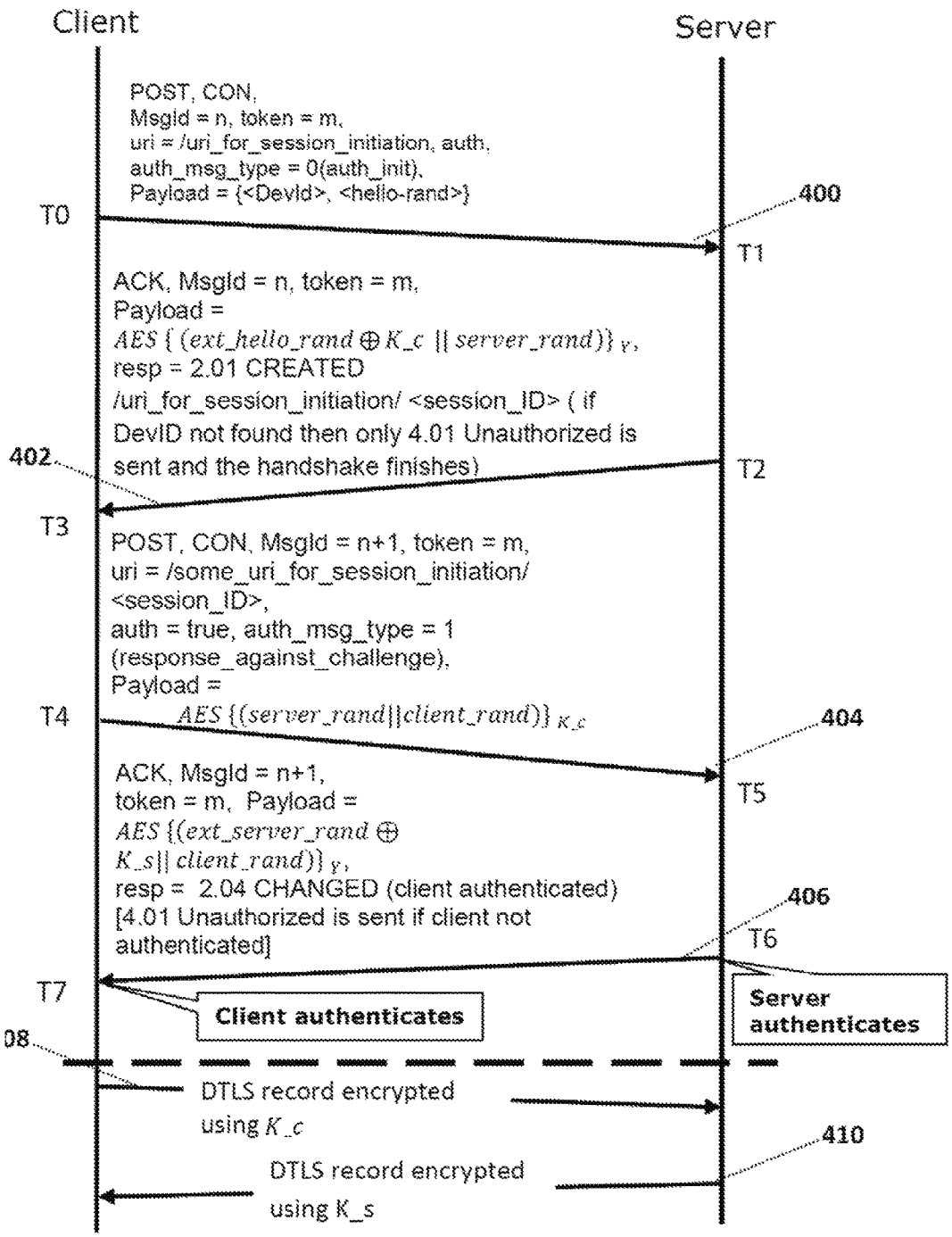
FIG. 5 illustrates an exemplary implementation of the session establishment over CoAP and the subsequent encrypted message exchange over UDP transport between a client and a server end-point.

Referring to accompanying drawings FIG. 5 illustrates an exemplary implementation of session establishment over CoAP and the subsequent encrypted message exchange over UDP transport between a client and a server end-point. Following steps describe the flow:

- At initiation, client sends a POST message in CON mode to a specific server URI which is dedicated for session initiation. For example, /some_uri_for_session_initiation with AUTH='True' and AUTH_MSG_TYPE='auth_init', and 'device identifier' (DevID) and a random number 'hello_rand' in the payload 400.
- The server derives device identifier from payload and determines pre-shared secret associated with that device-identifier after receiving options 'AUTH', and 'auth_init' value for AUTH_MSG_TYPE. It then generates a random number, server_rand as a challenge and the client-write key K_c for the session 402.
- Server responds back the client with a response code indicating a new resource has been created. The URI in the response indicates a session ID for the secure session. In case of an invalid device identifier server sends a response code 'Unauthorized'. The encrypted payload of step 402 is either piggybacked or separately sent to the client.
- The client decrypts response received from server and obtains server_rand and 'K_c'. The client also creates a challenge by generating a random number client_rand and then sends the payload as described in step 3 of Algorithm 1 using a POST message with option field 'AUTH=true', and AUTH_MSG_TYPE value as 'response_against_challenge', and with same token value as in last POST message 404.
- Server decrypts payload of above POST with above mentioned optional values in header by using 'K_c' and checks the received server_rand. Server sends a response with response code 'Changed' to indicate that a change in the resource was authenticated if server_rand is identical with its previous value (generated in step 402), otherwise sends 'Unauthorized'. This step completes client authentication 406.
- Client decrypts the response from the server using Y and matches the received client_rand with its own copy. Also, the client receives K_s. This step completes server authentication.
- Once the authentication is over both client and server creates the session key tuple {K_c, K_s, Client_IV, Server_IV}. The IV generation is done as depicted in FIG. 4.
- Now the client and server may optionally communicate over a secure transport layer like DTLS-PSK record encryption. The client encrypts using K_c and Client_IV 408 and the server encrypts using K_s and Server_IV 410.

Steps 400, 402, 404 and 406 illustrate secure session establishment—CoAP, whereas steps 408 and 410 illustrate the encrypted message exchange with replay protection—DTLS.

The AES encryption during secure session establishment may optionally be implemented as AES_128_CCM_8. CCM mode would need 12 bit nonce for each encryption and an additional data. 'hello_rand', 'server_rand' and 'client_rand' serve as the required nonce values in steps 302, 304 and 306 of FIG. 3 respectively. The 'additional data' required for CCM encryption may come from the CoAP header part.

Figure 6:
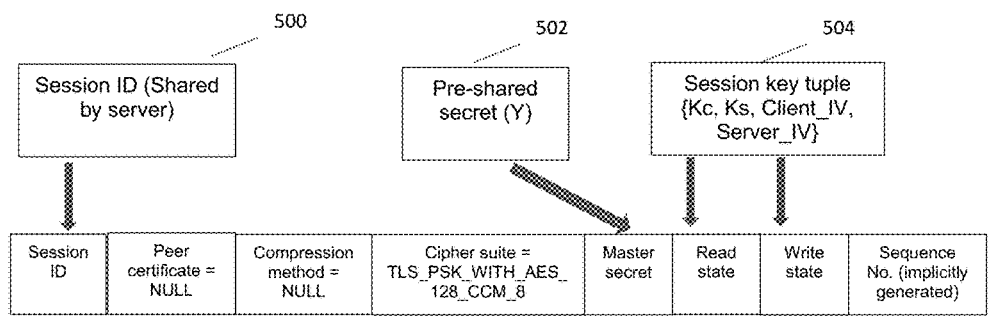
FIG. 6 illustrates mapping of the session parameters resulting from the secure session establishment to the session parameter structure similar to record encryption mechanism as used in DTLS-PSK.

Referring to the accompanying drawings, FIG. 6 illustrates mapping between the different session parameters that are a result of secure session establishment as disclosed by the present disclosure and the session parameter structure as required by a conventional DTLS record encryption mechanism. It shows the elements of the session tuple for DTLS-PSK record encryption where 500, 502 and 504 denote the session parameters used for the secure session establishment.

Referring to the accompanying drawings, FIG. 7 illustrates a flow diagram of an embodiment of the system providing interface between session establishment process at the application layer and channel encryption process at the transport layer using exemplary protocols. In this embodiment, the system performs lightweight secure session establishment 702 at the application layer (CoAP). Once the secure session is established, session parameters including a client key and a server key are obtained. These session parameters are provided to the interface layer that provides cross layer interface. At this layer, an encryption parameter tuple {client write key (K_c), server write key (K_s), client initialization vector (Client_IV), server initialization vector (Server_IV)} is derived and the required encryption parameters are mapped to the session parameters as required for an encryption scheme similar to record encryption in DTLS-PSK 704. This allows encrypted exchange of data present at the application layer over the secure channel on UDP transport layer using mechanism similar to DTLS record encryption with symmetric key 706.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A computer implemented system operating within a network for lightweight secure session establishment and secure encrypted data exchange between a plurality of client devices and a plurality of servers, said system comprising:
    components for secure session establishment grouped in an application layer associated with said network, wherein said components for secure session establishment comprise:
        a first key generator, a first random number generator and a second random number generator configured in each of said client devices, and a third random number generator and a second key generator configured in each of the plurality of servers;
        said configuration of the components grouped in the application layer adapted to facilitate secure session establishment between the client devices and the servers by mutual authentication; and
    components for secure encrypted data exchange grouped in a transport layer associated with said network, wherein said components for secure encrypted data exchange comprise:
        a session key tuple creator having a session initialization vector creator, said session key tuple creator configured to create and transmit a session key tuple, to mutually authenticated client devices and servers, wherein said session key tuple creator is configured to receive a client key, a server key and random numbers generated by a client device and a server during authentication, and said session initialization vector creator is configured to create the client initialization vector and the server initialization vector using the received random numbers, said session key tuple creator is further configured to create and transmit the session key tuple containing the received client key, the received server key, the client initialization vector and the server initialization vector to the client device and the server thereby enabling secure encrypted data exchange between the client device and the server;
        said configuration of components grouped in the transport layer adapted to enable secure encrypted data exchange between the client devices and the servers based on a cross layer approach;
    wherein each of the plurality of client devices comprise the following:
        a first processor configured to provide a first set of processing commands based on a pre-determined first set of rules;
        the first random number generator configured to cooperate with the first processor and further configured to generate a first random number under influence of the first set of processing commands;
        a session initiator configured to generate and transmit to the server under influence of first set of processing commands, a session initiation request containing the first random number and a pre-determined unique identifier;
        a first decrypter configured to cooperate with the server to receive an encrypted challenge code and with the first key generator to receive a secret key and further configured to decrypt with the received secret key and under influence of the first set of processing commands, the encrypted challenge code to obtain a third random number and the client key;

a second repository configured to cooperate with the first decrypter to receive and store the client key;

the second random number generator configured to cooperate with the first processor, and generate under influence of the first set of processing commands, a second random number;

a response generator configured to cooperate with the first decrypter to receive the third random number and with the second random number generator to receive the generated second random number, and further configured to generate a response code based on the received third random number and the received second random number;

a second encrypter configured to cooperate with the second repository to receive the client key and with the response generator to receive the response code and further configured to encrypt the response code with the received client key to obtain and transmit an encrypted response code;

a third decrypter configured to cooperate with the server to receive an encrypted final message and with the first key generator to receive the secret key and further configured to decrypt with the received secret key and under influence of the first set of processing commands, the encrypted final message to obtain a second random number and a server key, and store the server key in the second repository; and a second comparator configured to cooperate with the third decrypter to receive the obtained second random number and with the second random number generator to receive the generated second random number and further configured to compare the generated second random number with the received second random number to authenticate the server thereby achieving secure session establishment for data exchange with the server;

wherein the random numbers generated by the first random number generator, the second random number generator and the third random number generator are non-reproducible and change from session to session;

wherein each of the plurality of servers comprise the following:

a second processor configured to provide a second set of processing commands based on a pre-determined second set of rules;

a first repository configured to store a plurality of unique identifiers, wherein each of the unique identifier corresponds to the client device;

an identifier configured to cooperate with the second processor, the first repository and a client device to respectively receive the second set of processing commands, the stored unique identifiers and a session initiation request containing a first random number and a unique identifier, and further configured to match the received unique identifier with the stored unique identifiers to identify the client device;

the second key generator configured to cooperate with the second processor and generate and transmit a unique client key and a unique server key under influence of the second set of processing commands;

the third random number generator configured to cooperate with the second processor and generate and transmit a third random number under influence of the second set of processing commands;

a challenge code generator configured to cooperate with the identifier to receive the first random number, the second key generator to receive the client key and the third random number generator to receive the third random number, and further configured to generate a challenge code based on the first random number, the client key and the third random number;

a first encrypter configured to cooperate with the challenge code generator to receive the generated challenge code and with the first key generator to receive a secret key, and further configured to encrypt under influence of the second set of system processing commands, the received challenge code with the secret key to obtain and transmit an encrypted challenge code;

a second decrypter configured to cooperate with the second key generator to receive the client key and with the client device to receive an encrypted response code, and further configured to decrypt the received encrypted response code with the client key to obtain a second random number and a third random number present in the response code;

a first comparator configured to cooperate with the second decrypter to receive the obtained third random number and with the third random number generator to receive the generated third random number and further configured to compare the generated third random number with the received third random number to authenticate the client device; and a third encrypter configured to cooperate with the second decrypter, the first comparator and the first key generator and further configured to generate and encrypt a final message containing the third random number, the server key and the second random number encrypted with the secret key to obtain and transmit to the client device, an encrypted final message to facilitate secure session establishment for data exchange with the client device.

2. The computer implemented system as claimed in claim 1, wherein the first key generator is configured to generate and transmit secret keys to the servers and the client devices prior to establishing a secure session between the client device and the server in said system.

3. The computer implemented system as claimed in claim 2, wherein the secret key generated by the first key generator is the unique key generated at the start of a session and is valid only during the ongoing session.

4. The computer implemented system as claimed in claim 1, wherein the random numbers generated by the first random number generator, the second random number generator and the third random number generator are non-reproducible and change from session to session.

5. The computer implemented system as claimed in claim 1, wherein the secure encrypted data exchange between the client device and the server is based on key-establishment, wherein the client device is configured to encrypt data using the client key and the client initialization vector, and configured to decrypt data using the server key and the server initialization vector, and the server is configured to encrypt data using the server key and the server initialization vector and further configured to decrypt data using the client key and the client initialization vector thereby maintaining separate encryption and decryption keys for the client device and the server.

6. The computer implemented system as claimed in claim 1, wherein the system is configured to integrate with the application layer for constrained devices including CoAP to provide secure session establishment; and configured to integrate with the transport layer security schemes including DTLS to provide secure encrypted data exchange.

7. The computer implemented system as claimed in claim 1, wherein the system is configured:
   i. to create and map the session key tuples using the interface layer;
   ii. to provide session establishment over application layer in encrypted domain using symmetric encryption with integrity check using message authentication;
   iii. to derive session parameters that are mapped with a session structure;
   iv. to provide secure session encryption over a constrained application protocol including CoAP and subsequent exchange of encrypted data over a secure channel on UDP transport.

8. A computer implemented method operating within a network for lightweight secure session establishment and secure encrypted data exchange between a plurality of client devices and a plurality of servers, said method comprising the following steps:
   grouping components in an application layer associated with said network for providing secure session establishment, wherein said step of providing secure session establishment comprises the following steps:
      generating and transmitting secret keys to the servers and the client devices prior to establishing a secure session between a client device and a server;
      initiating, from the client device a session with the server and authenticating the server using said transmitted secret key, thereby establishing a secure session for data exchange between the server and the client device by mutual authentication;
      receiving, at the server, a session initiation request from the client device and, identifying and authenticating the client device using said transmitted secret key; and
      configuring the components grouped in the application layer for facilitating secure session establishment for data exchange between the client devices and the servers by mutual authentication; and
   grouping components in the transport layer associated with said network for providing secure encrypted data exchange, wherein said step of providing secure encrypted data exchange comprises the following steps:
      creating and transmitting a session key tuple to mutually authenticated client devices and servers, wherein the step of creating and transmitting the session key tuple further comprises the following steps:
         receiving a client key, a server key and random numbers generated by a client device and a server during authentication;
         creating a client initialization vector and a server initialization vector using the received random numbers;
         creating the session key tuple containing the received client key, the received server key, the client initialization vector and the server initialization vector; and
         transmitting the created session key tuple to the client device and the server thereby enabling secure encrypted data exchange between the client device and the server;
      configuring the components grouped in the transport layer for enabling secure encrypted data exchange between the client devices and the servers based on a cross layer approach;
   wherein implementation of said method at the client device comprises the following steps:
      providing a first set of processing commands based on a pre-determined first set of rules;
      generating a first random number under influence of the first set of processing commands;
      generating and transmitting to the server, under influence of first set of processing commands, a session initiation request containing the first random number and a pre-determined unique identifier;
      receiving an encrypted challenge code and a secret key and decrypting with the received secret key and under influence of the first set of processing commands, the encrypted challenge code to obtain a third random number and a client key;
      storing the obtained client key;
      generating under influence of the first set of processing commands, a second random number;
      generating a response code based on the third random number and the second random number;
      encrypting the response code with the stored client key to obtain and transmit an encrypted response code;
      receiving an encrypted final message and decrypting with the received secret key and under influence of the first set of processing commands, the encrypted final message to obtain a second random number and a server key;
      storing the obtained server key; and
      comparing the generated second random number with the obtained second random number to authenticate the server thereby achieving secure session establishment for data exchange with the server;
   wherein implementation of said method at the server comprises the following steps:
      providing a second set of processing commands based on a pre-determined second set of rules;
      storing a plurality of unique identifiers, wherein each of the unique identifier corresponds to the client device;
      receiving a session initiation request containing a first random number and a unique identifier, and matching the received unique identifier with the stored unique identifiers to identify the client device;
      generating a unique client key and a unique server key under influence of the second set of processing commands;
      generating and transmitting a third random number under influence of the second set of processing commands;
      generating a challenge code using the first random number, the client key and the third random number;
      encrypting, under influence of the second set of system processing commands, the generated challenge code with the secret key to obtain and transmit an encrypted challenge code;
      receiving an encrypted response code, and decrypting the received encrypted response code with the client key to obtain a second random number and a third random number present in the response code;
      comparing the generated third random number with the obtained third random number to authenticate the client device; and
      generating and encrypting a final message containing the third random number, the server key and the second random number encrypted with the secret key for obtaining and transmitting to the client device, an encrypted final message to facilitate secure session establishment for data exchange with the client device;

wherein the steps of generating the first random number, the second random number and the third random number include the steps of generating random numbers that are non-reproducible and change from session to session.

9. The computer implemented method as claimed in claim 8, wherein the step of exchanging encrypted data between the client device and the server is based on a step of key-establishment using the session key tuple and comprises steps of maintaining separate encryption and decryption keys for the client device and the server, and further comprises the following steps:

encrypting data at the client device using the client key and the client initialization vector;

decrypting data at the client device using the server key and the server initialization vector;

encrypting data at the server using the server key and the server initialization vector; and decrypting data at the server using the client key and the client initialization vector.

10. The method as claimed in claim 8, wherein the step of generating the secret key includes the step of generating the unique key at the start of a session, wherein the unique key is valid only during an ongoing session.

11. The method as claimed in claim 8, wherein the method includes steps of creating and mapping the session key tuples using the interface layer; and establishing the session over the application layer in an encrypted domain by using symmetric encryption with integrity check using message authentication.

12. The method as claimed in claim 8, wherein the method includes the steps of deriving session parameters that are mapped with a session structure and/or providing secure session encryption over a constrained application protocol including CoAP and subsequently exchanging encrypted data over a secure channel on UDP transport.

13. The method as claimed in claim 8, wherein said method implements the cross layer approach and includes steps of establishing a session by using an upper layer including the application layer and, performing channel encryption by using a lower layer including the transport layer thereby providing more control to the upper layer.

* * * * *